United States Patent
Hosotani (10) Patent No.: US 8,615,525 B2
(45) Date of Patent: Dec. 24, 2013

(54) SEARCHING DEVICE, SEARCHING METHOD AND COMPUTER-READABLE STORAGE MEDIUM PERMITTING EFFICIENT PRESENTATION AND SELECTION OF SEARCH TERM ATTRIBUTE INFORMATION

(75) Inventor: Nobuhiro Hosotani, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 87 days.

(21) Appl. No.: 13/278,736

(22) Filed: Oct. 21, 2011

(65) Prior Publication Data

US 2012/0143891 A1   Jun. 7, 2012

(30) Foreign Application Priority Data

Dec. 1, 2010   (JP) .................................. 2010-268477

(51) Int. Cl.
*G06F 7/00* (2006.01)
*G06F 17/30* (2006.01)

(52) U.S. Cl.
USPC ......................................................... 707/766

(58) Field of Classification Search
None
See application file for complete search history.

(56) References Cited

U.S. PATENT DOCUMENTS

| 2009/0030599 A1 | 1/2009 | Kawauchi |
| 2009/0234847 A1* | 9/2009 | Homma et al. ................... 707/5 |
| 2011/0023068 A1* | 1/2011 | Zeldis et al. .................... 725/61 |
| 2013/0021259 A1* | 1/2013 | Sudo et al. ..................... 345/169 |

FOREIGN PATENT DOCUMENTS

JP    A-2009-054133    3/2009

* cited by examiner

*Primary Examiner* — Uyen Le
(74) *Attorney, Agent, or Firm* — Oliff & Berridge, PLC (57) ABSTRACT

A searching device including a data storage unit that stores a plurality of pieces of data, each of which prescribes search terms respectively corresponding to a plurality of attributes of the piece of data; a character input unit that is configured to input characters that constitute an input search term one by one; and an attribute specifying screen display unit that, when a next character is input subsequently to a input character that has been input by the character input unit, displays an attribute specifying screen, including a corresponding attribute corresponding to at least one candidate of the input search term to be extracted from among the search terms by inputting the next character, configured such that the corresponding attribute is specified by a user.

5 Claims, 6 Drawing Sheets

SEARCHING DEVICE, SEARCHING METHOD AND COMPUTER-READABLE STORAGE MEDIUM PERMITTING EFFICIENT PRESENTATION AND SELECTION OF SEARCH TERM ATTRIBUTE INFORMATION

INCORPORATION BY REFERENCE

The disclosure of Japanese Patent Application No. 2010-268477 filed on Dec. 1, 2010 including the specification, drawings and abstract is incorporated herein by reference in its entirety.

BACKGROUND OF THE INVENTION

1. Field of the Invention

The present invention relates to a searching device, a searching method and a computer-readable storage medium that search through data on the basis of an input search term.

2. Description of the Related Art

In a related art, there is known a searching device that searches through data stored in a database on the basis of a search term. For example, in a navigation system that searches through destination data, search terms respectively corresponding to a plurality of attributes, such as name, address and genre, of each piece of data are prescribed for each of pieces of destination data stored in a database, and any one of the search terms is input to make it possible to find the corresponding destination data.

Here, an input method for a search term includes an input method in which an attribute is specified first and then a search term is selected from among displayed candidates and a free word input method in which a character is directly input without specifying an attribute first. For example, Japanese Patent Application Publication No. 2009-54133 (JP-A-2009-54133) describes a navigation system that searches through destination data using the free word input method.

SUMMARY OF INVENTION

At the time of a free word input, it is conceivable that, in process of inputting a search term, a search term that is not intended by a user may be extracted as a candidate. For example, this is the case where, when the user intends to input a search term corresponding to genre, there are a large number of search terms corresponding to name or address, which include the same character as that of the search term corresponding to genre. In this case, it takes time to extract search term candidates, so the efficiency of input operation problematically decreases.

The present invention provides a searching device, a searching method and a computer-readable storage medium that allows efficient input operation of a search term.

A first aspect of the present invention provides a searching device. The searching device includes: a data storage unit that stores a plurality of pieces of data, each of which prescribes search terms respectively corresponding to a plurality of attributes of the piece of data; a character input unit that is configured to input characters that constitute an input search term one by one; and an attribute specifying screen display unit that, when a next character is input subsequently to a input character that has been input by the character input unit, displays an attribute specifying screen, including a corresponding attribute corresponding to at least one candidate of the input search term to be extracted from among the search terms by inputting the next character, configured such that the corresponding attribute is specified by a user.

With the searching device according to the first aspect, it is possible to improve the efficiency of user's input operation.

A second aspect of the present invention provides a searching method. The searching method includes: inputting characters that constitute an input search term one by one; and when a next character in the input search term is input subsequently to an input character in the input search term, displaying an attribute specifying screen, including a corresponding attribute corresponding to at least one candidate of the input search term, configured such that the corresponding attribute is specified by a user, wherein the at least one candidate of the input search term is extracted, by inputting the next character, from among search terms that are prescribed for each of a plurality of pieces of data stored in a data storage unit and that respectively corresponds to a plurality of attributes of the pieces of data.

With the searching method according to the above second aspect, a similar advantageous effect to that of the searching device according to the first aspect is obtained.

A third aspect of the present invention provides a computer-readable storage medium that stores computer-executable instructions for performing a searching method. The searching method includes: inputting characters that constitute an input search term one by one; and when a next character in the input search term is input subsequently to an input character in the input search term, displaying an attribute specifying screen, including a corresponding attribute corresponding to at least one candidate of the input search term, configured such that the corresponding attribute is specified by a user, wherein the at least one candidate of the input search teen is extracted, by inputting the next character, from among search terms that are prescribed for each of a plurality of pieces of data stored in a data storage unit and that respectively corresponds to a plurality of attributes of the pieces of data.

With the computer-readable storage medium according to the third aspect, a similar advantageous effect to that of the searching device according to the first aspect is obtained.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, a navigation system that is an embodiment of the searching device according to the aspect of the invention will be described with reference to the accompanying drawings.

First Embodiment

Figure 1:
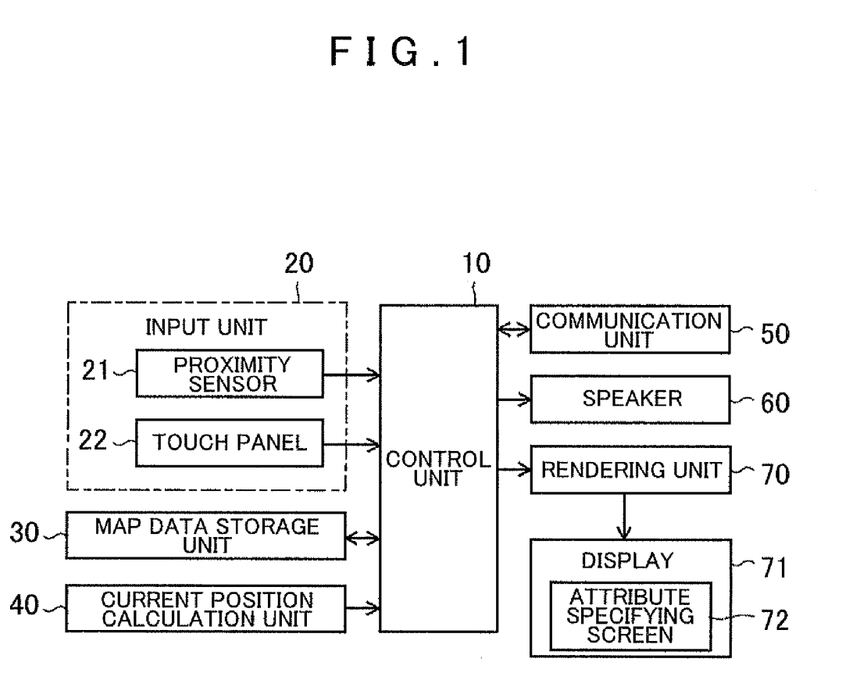
FIG. 1 is a block diagram that shows the schematic configuration of a navigation system according to a first embodiment of the present invention.

FIG. 1 is a block diagram that shows the schematic configuration of the navigation system. The navigation system is configured mainly by a control unit 10. An input unit 20, a map data storage unit 30, a current position calculation unit 40, a communication unit 50, a speaker 60 and a rendering unit 70 are connected to the control unit 10. A display 71 is connected to the rendering unit 70. In the present embodiment, the input unit 20 serves as a "character input unit", the map data storage unit 30 serves as a "data storage unit" and the display 71 serves as an "attribute specifying screen display unit".

The control unit 10 is formed as an ordinary computer. The control unit 10 includes a CPU, a ROM, an input/output port, a bus line that connects these components, and the like. The control unit 10 controls the entire navigation system.

The input unit 20 includes a proximity sensor 21 and a touch panel 22. The proximity sensor 21 senses the proximity of a finger, or the like. Input operation may be performed by touching the touch panel 22. The input unit 20 issues instructions to the system. The proximity sensor 21 is, for example, attached to the top and bottom or right and left of the display 71. The proximity sensor 21 transmits and receives light or an electric wave to sense the presence of an object that is in proximity to the display 71. The touch panel 22 detects pressing force when the display 71 is touched.

The map data storage unit 30 is, for example, a storage device that is implemented as a storage medium, such as a hard disk drive (HDD), a DVD-ROM and a memory card. The map data storage unit 30 stores so-called map matching data for improving the accuracy of position detection and map data for searching for a route.

The map data include destination data. Specifically, the map data store point of interest (POI) information associated with an ID that determines a destination. Each piece of data corresponding to the POI information prescribes search terms respectively corresponding to attributes, such as name, address and genre. The user is able to search through destination data on the basis of the search terms respectively corresponding to the attributes. Examples of the search term corresponding to name are "XX university", "YY clinic", "ZZ burger", and the like. Examples of the search term corresponding to address are "Aichi prefecture", "Okazaki city", and the like. Examples of the search term corresponding to genre are "school", "hospital", "restaurant", and the like.

The current position calculation unit 40 calculates the current position of the vehicle. The current position calculation unit 40, for example, includes a geomagnetic sensor, a gyroscope, a distance sensor, a global positioning system (GPS) receiver, and the like. The GPS receiver receives radio waves from satellites. These devices respectively have errors of which characteristics are different from each other, so they are used while complementing one another.

The communication unit 50 is a component that is used to carry out information communication with an external device. The communication unit 50 carries out communication with an external center device (not shown) to thereby acquire various pieces of information from the center device.

The speaker 60 is used to output voice, and is, for example, used when a route guidance, or the like, is performed by voice.

The display 71 is connected to the rendering unit 70. The display 71 is a color display device that is formed using a liquid crystal, or the like. The control unit 10 displays a map or information on the display 71 via the rendering unit 70.

Figure 2:
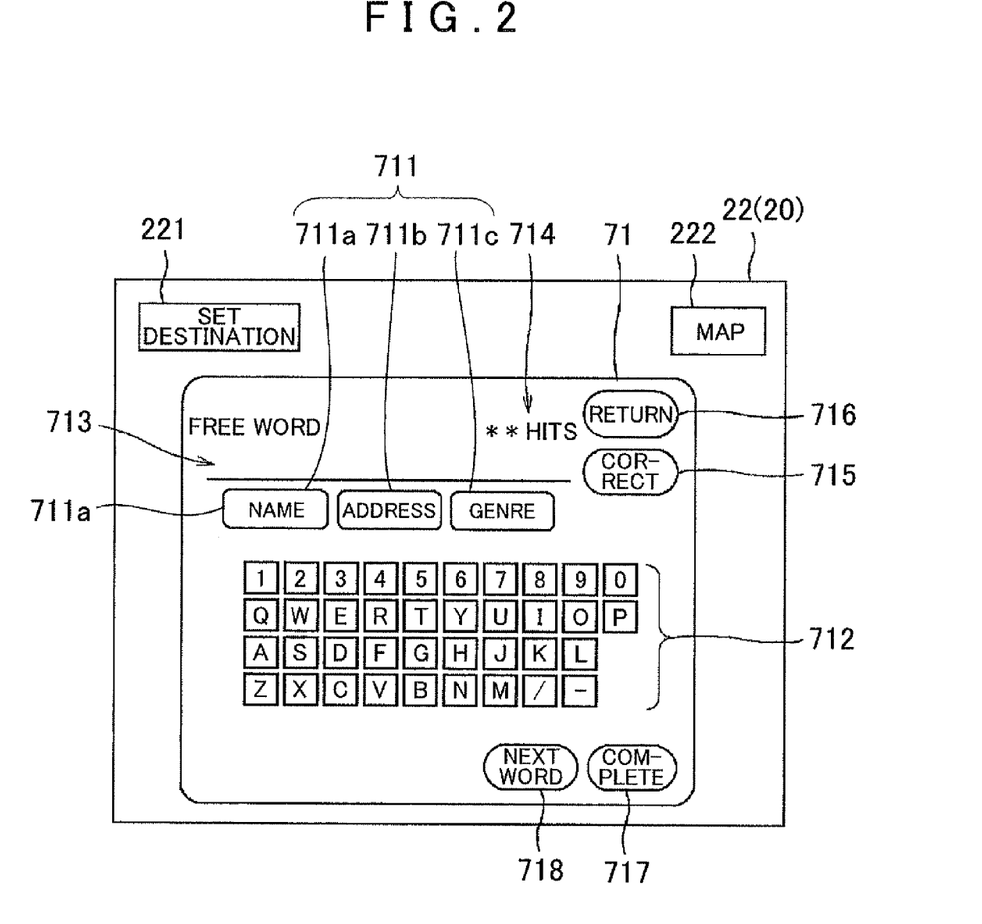
FIG. 2 is a view for illustrating an input unit and a display according to the first embodiment of the present invention.

As shown in FIG. 2, the display 71 displays various menus, such as a destination setting screen and a map screen around a current position. The display 71 is provided with the proximity sensor 21 and the touch panel 22 as the input unit 20. A fixed frame of the input unit 20 is arranged at the outer periphery of the display 71. A destination setting key 221 and a map key 222 are provided at the upper side of the fixed frame. The destination setting key 221 is formed of a push button (hard key). The map key 222 is used to display the map screen around the current position.

The destination setting key 221 is a key that is used to set a destination by executing data searching process according to the present embodiment. When a destination is set, a map screen around the destination is displayed or a route to the destination is searched.

As shown in FIG. 2, attribute tabs 711, an input keyboard 712, an input character field 713, a data count field 714, a correction key 715, a return key 716, a complete key 717 and a next word key 718 are displayed on the display 71.

The attribute tabs 711 are used to specify an attribute at the beginning of an input. A user selects any one of a name tab 711a, an address tab 711b and a genre tab 711c to thereby make it possible to extract candidates of a search term corresponding to a selected attribute to determine the search term. In contrast to this, a method of directly inputting a search term without specifying an attribute using the attribute tabs 711 at the beginning of an input is termed "free word input", and a screen for free word input is termed "free word input screen". The present embodiment have a characteristic in data searching process using a free word input.

The input keyboard 712 is formed of keys for inputting alphabets. When a finger, or the like, touches any one of the keys of the input keyboard 712, the touch panel 22 recognizes and inputs a character corresponding to the touched key. In addition, when a finger, or the like, is brought close to any one of the keys of the input keyboard 712, the proximity sensor 21 recognizes a character corresponding to the key to which the finger, or the like, is in proximity. At this time, when an attribute is not specified, an attribute specifying screen 72 is displayed to the front of the input keyboard 712, as will be described later.

A character, or the like, input through the input keyboard 712 is displayed on the input character field 713. The number of data extracted using an input search term is displayed on the data count field 714. The correction key 715 is a key used to correct an input character. The return key 716 is a key used to return to a state previous to the last operation. The complete key 717 is a key used to complete an input of a search term and execute searching.

The next word key 718 is a key used to, when a plurality of search terms are input, complete an input of the current search term at the latest input character and proceed to an input of the next search term. When a plurality of search terms are input, the logical disjunction operation or logical conjunction operation is implemented on pieces of data found by the search terms.

Figure 3:
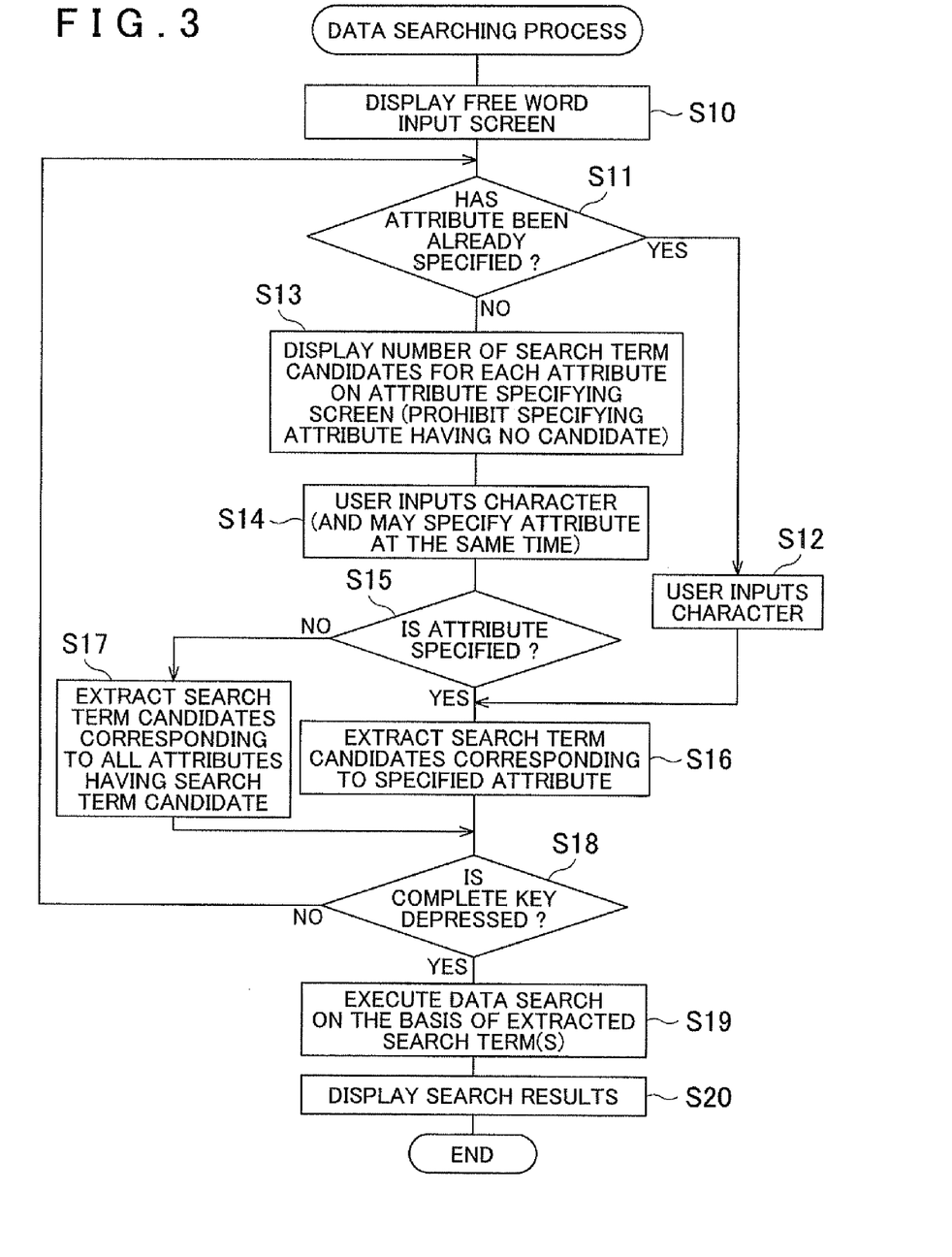
FIG. 3 is a flowchart that shows a data searching process according to the first embodiment of the present invention.

Next, the data searching process executed by the control unit 10 of the searching device will be described with reference to the flowchart shown in FIG. 3. Note that the symbol S denotes "step" in the description of the flowchart. In S10, the free word input screen is displayed on the display 71. In S11, the control unit 10 determines whether an attribute has been specified by the input until then. When affirmative determination is made in S11, the process proceeds to S12, and the user inputs the next character subsequent to the input character(s). When negative determination is made in S11, the process proceeds to S13. Note that negative determination is definitely made in S11 when the first character is input.

In S13, the attribute specifying screen 72 is displayed to the front of the input keyboard 712 of the display 71. On the attribute specifying screen 72, the number of candidates of the search term (search term candidates) to be extracted by inputting the next character is displayed for each attribute. In addition, an attribute having no search term candidate is displayed in toned-down brightness to thereby make the user recognize that there is no search term candidate and prohibit the user from specifying that attribute.

In S14, the user specifies an attribute and inputs the next character at the same time. Alternatively, the user may input only a character without specifying an attribute. In S15, the control unit 10 determines whether an attribute is specified. When affirmative determination is made in S15 or when a character is input in S12, the process proceeds to S16, and then the control unit 10 extracts search term candidates corresponding to the specified attribute. On the other hand, when negative determination is made in S15, the process proceeds to S17, and then the control unit 10 extracts search term candidates corresponding to all the attributes having a search term candidate.

After S16 or S17, the control unit 10 determines in S18 whether the complete key 717 is depressed. When the number of the search term candidates is, for example, reduced to about several numbers through S16 or S17, the user may depress the complete key 717 in the stage in which not all the characters that constitute the search term are input. Alternatively, when there is still several tens or more of search term candidates and the user determines that the number of the search term candidates is not sufficiently reduced, the process may return to S11, and the next character may be input.

When the complete key 717 is depressed (YES in S18), the control unit 10 searches through data on the basis of the search term(s) (the extracted search term candidates) in S19. In S20, data search results are displayed on the display 71.

Next, the input operation of a search term in the navigation system according to the first embodiment will be described with reference to FIG. 4A to FIG. 4C and FIG. 5A to FIG. 5C. By way of example, it is assumed that the user searches for destination data "AIT land". For the destination data "AIT land", a term "AIT land" as the search term having the name attribute, a term "Tokyo prefecture, XX ward" as the search term having the address attribute and a term "amusement park" as the search term having the genre attribute are stored in the map data storage unit 30. It is assumed that the user completes an input of the first character "A" without specifying an attribute using the attribute tabs 711 at the beginning on the free word input screen. Thus, the character "A" is displayed on the input character field 713.

Figure 4A:
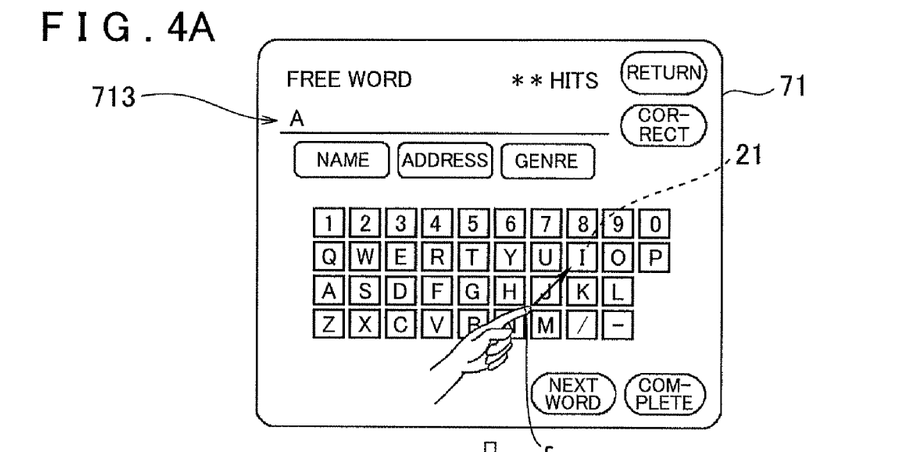
FIG. 4A, FIG. 4B and FIG. 4C are views for illustrating the input operation of a search term according to the first embodiment of the present invention.
Figure 4B:
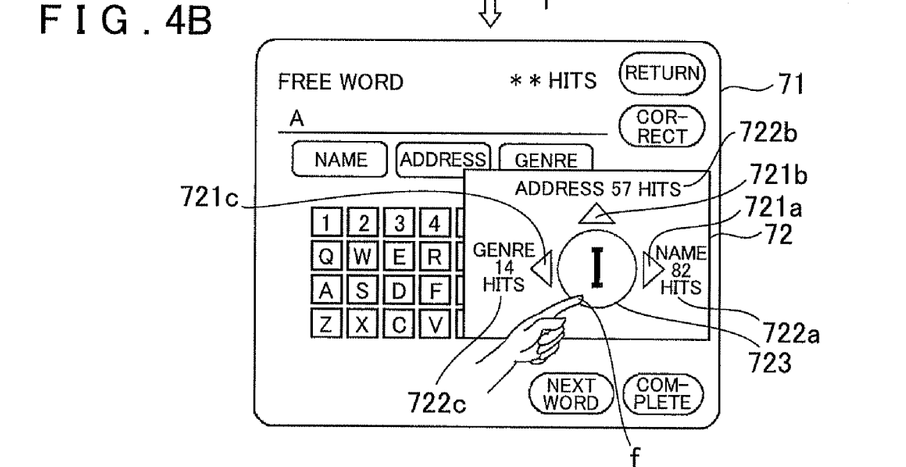

Subsequently, as shown in FIG. 4A, when the user causes a finger f to touch the second character "I" key, the touch panel 22 senses pressing force. Then, the control unit 10 displays the attribute specifying screen 72 as shown in FIG. 4B. The enlarged circled "I" character key 723 is displayed at the center of the attribute specifying screen 72. A name specifying key 721a for specifying the name attribute is displayed by a rightward triangle on the right side of the character key 723. In addition, the number of search term candidates having the name attribute, extracted by inputting the character "I", that is, the number of search term candidates having the name attribute, including a string "AI", is displayed on a count display field 722a adjacent to the name specifying key 721a.

Similarly, an address specifying key 721b for specifying the address attribute is displayed in upward triangle on the upper side of the character key 723, and the number of search term candidates having the address attribute, including the string "AI", is displayed on a count display field 722b. A genre specifying key 721c for specifying the genre attribute is displayed in leftward triangle on the left side of the character key 723, and the number of search term candidates ("Airport", or the like) having the genre attribute, including the string "AI", is displayed on a count display field 722c. Here, for any address, name and genre attributes, the number of search term candidates that include the string "AI" is equal to or larger than 1, so all the specifying keys 721a, 721b and 721c are displayed so that they may be specified.

Figure 4C:
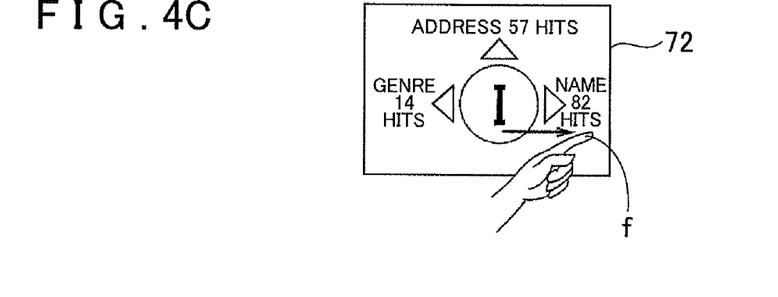

Subsequently, when the user determines to specify the name attribute, the finger f is flicked rightward while touching the touch panel 22 as shown in FIG. 4C to thereby specify the name attribute and fix the input of the character "I". Alternatively, when the user determines not to specify an attribute in this stage, the character key 723 is touched to fix the input of the character "I". Here, the description proceeds to the description of FIG. 5A to FIG. 5C on the assumption that the input of the character "I" is fixed without user's specifying an attribute.

Figure 5A:
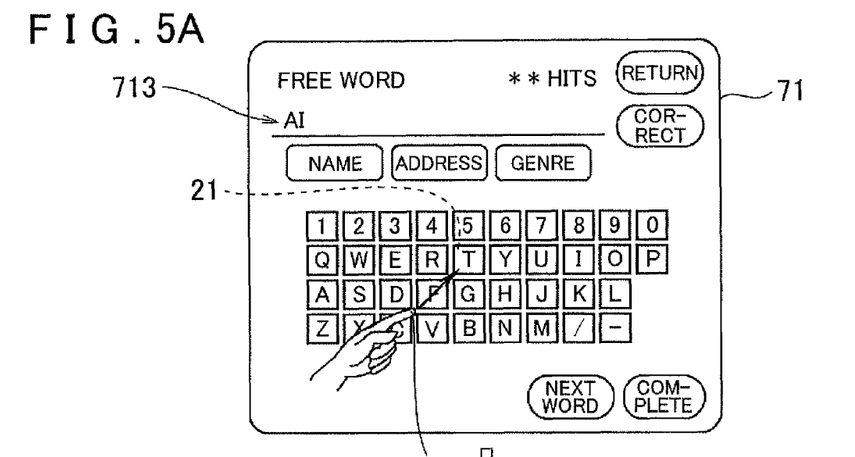
FIG. 5A, FIG. 5B and FIG. 5C are views for illustrating the input operation of the search term according to the first embodiment of the present invention.
Figure 5B:
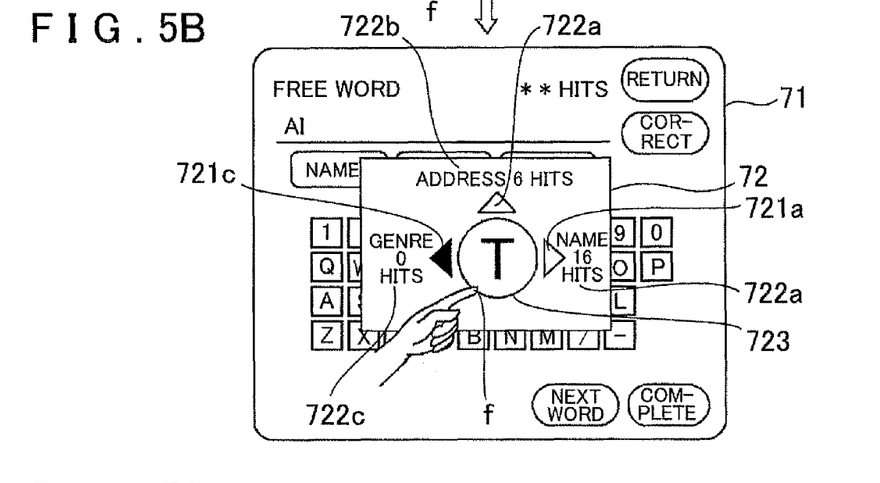

In FIG. 5A, similar to FIG. 4A, when the user causes the finger f to touch the third character "T" key, the touch panel 22 senses pressing force, and the control unit 10 displays the attribute specifying screen 72 shown in FIG. 5B. In this case, there are search term candidates, including a string "AIT", having the name attribute and address attribute, so the numbers of search term candidates are displayed as in the case of FIG. 4B. However, there is no search term candidate, including the string "AIT", having the genre attribute, so the number of candidates is displayed as "0", and the genre specifying key 721c is toned down (solid black in the drawing). Then, even if the finger f is flicked leftward, the genre attribute cannot be specified.

Figure 5C:
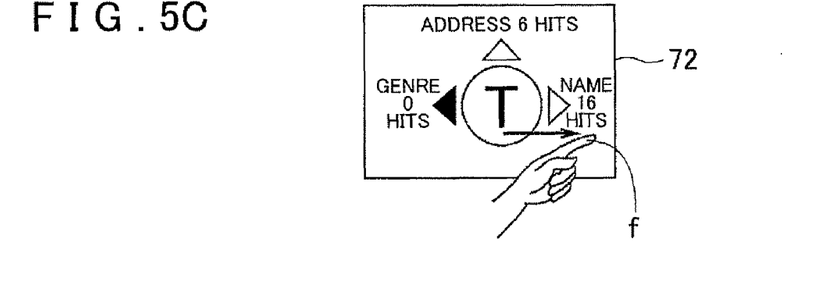

Then, when the user flicks the finger f rightward as shown in FIG. 5C to specify the name attribute, the input of the character "T" is fixed. Subsequently, when the user depresses the complete key 427, the control unit 10 searches for destination data that prescribes the search term, including the string "AIT", having the name attribute, and the search results, such as "AIT tourist hotel", "AIT ward office" and "AIT land", are displayed on the display 71. Then, when the user selects the "AIT land", the "AIT land" is set as a destination.

As described above, in the searching device according to the present embodiment, when the user does not specify the attribute of search terms at the beginning, "an attribute specifying screen, including an attribute (a corresponding attribute) corresponding to a search term candidate (candidate of an input search term), configured such that the attribute is specified by a user" is displayed. By so doing, the user is able to determine whether to specify an attribute while checking the attribute corresponding to the search term candidate. Thus, an attribute is specified in process of inputting a search term to narrow the range of extracting search term candidate. By so doing, it is possible to improve the efficiency of input operation.

In addition, when an attribute has been already specified, no attribute specifying screen is displayed at the time of an input of a character thereafter. By so doing, a displayed screen does not unnecessarily change, so it is possible to eliminate user's inconvenience. In addition, the processing load of the control unit 10 is reduced.

Furthermore, for the attribute (the corresponding attribute) having search term candidates, the number of search term candidates is displayed. By so doing, the user is able to determine whether to specify an attribute while checking the number of the search term candidates. Thus, for example, when the number of the search term candidates is equal to or larger than expected, the attribute is specified to reduce the number of search term candidates to make it easy for the user to recognize the number of the search term candidates.

Furthermore, for attribute having no search term candidate (another attribute), the user is prohibited from specifying the attribute on the attribute specifying screen. By so doing, it is possible to further improve the efficiency of input operation.

Second Embodiment

Figure 6A:
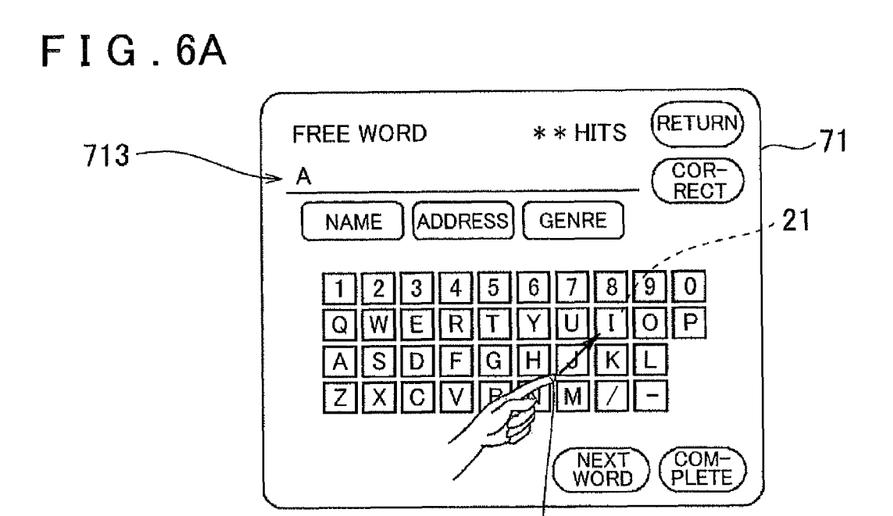
FIG. 6A and FIG. 6B are views for illustrating the input operation of a search term according to a second embodiment of the present invention.
Figure 6B:
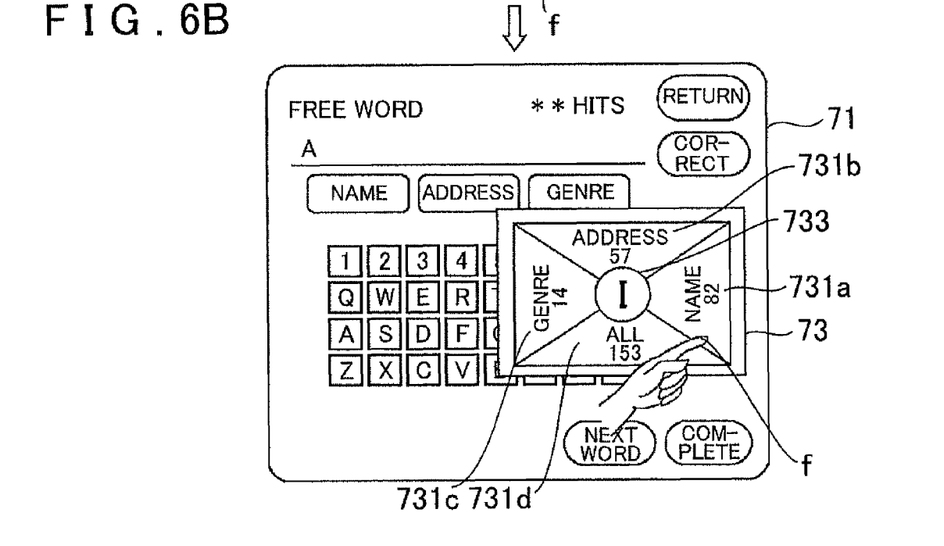

Next, a searching device according to a second embodiment will be described with reference to FIG. 6A and FIG. 6B. The second embodiment is similar to the first embodiment except the configuration of the attribute specifying screen. FIG. 6A shows a state where a character "I" is input subsequently to a character "A" as in the case of FIG. 4A of the first embodiment. When the finger f is brought close to the position of the "I" key, the proximity sensor 21 senses the proximity of the finger f, and then the attribute specifying screen 73 is displayed centering the position of the "I" key as shown in FIG. 6B.

The attribute specifying screen 73 is configured so that the rectangle is divided into four areas by diagonal lines and a character mark 733 that indicates the character "I" is displayed at the center of the rectangle. The four areas are a name area 731*a*, an address area 731*b*, a genre area 731*c* and an all attribute area 731*d*. A word that indicates an attribute and the number of search term candidates that include a string "AI" to be extracted by inputting the character "I" are displayed in each area.

The user touches any one of the four areas with the finger f to make it possible to specify an attribute through the touch panel 22. In addition, when the number of the search term candidates is zero, the corresponding area is toned down to prohibit specifying that area. The present embodiment differs from the first embodiment in that an attribute is specified by touching an area, instead of flick operation. In addition, when no attribute is specified, the present embodiment differs from the first embodiment in that not the central character mark 733 is touched but the all attribute area 721*d* is touched to fix a character input. In the second embodiment as well, as in the case of the first embodiment, an attribute is specified in process of inputting a search term to narrow the range of extracting the search term candidates to thereby make it possible to improve the efficiency of input operation.

The aspect of the present invention is not limited to the above described embodiments; it may be modified in various forms without departing from the scope of the invention.

Irrespective of whether an attribute has been already specified, the attribute specifying screen may be displayed each time a character is input. That is, the processes of S11 and S12 in the flowchart of FIG. 3 may be omitted. By so doing, for example, when the user realizes that an attribute is erroneously specified at the time of the next character input, it is possible to easily specify a correct attribute.

In the attribute specifying screen, the number of search term candidates may not be necessarily displayed. Alternatively, the number of search term candidates is not displayed in numeric value but may be displayed in the area ratio of a light emitting portion, such as an indicator.

In the above embodiments, after search term candidates corresponding to a specified attribute are extracted (S16) or search term candidates corresponding to all the attributes having a search term candidate are extracted (S17), the complete key 717 is depressed to execute data search and then the search results are displayed (S18 to S20). In an alternative embodiment, instead of the processes of S18 to S20, after extracting search term candidates, only keys corresponding to inputtable characters may be toned up from among the alphabets of the input keyboard 712, and keys corresponding to uninputtable characters may be toned down.

The above embodiments implement the searching device according to the aspect of the invention in form of the navigation system; instead, the aspect of the invention may be used as another searching device, such as "selecting a song in karaoke", "searching for a book in a library" and "hotel reservation".

What is claimed is:

1. A searching device comprising:
   a data storage unit that stores a plurality of pieces of data, each of which prescribes search terms respectively corresponding to a plurality of attributes of the piece of data;
   a display unit; and
   a control unit that:
   causes the display unit to display a freeword input screen that is configured to receive input specifying characters that constitute an input search term one by one;
   determines whether a character of the input search term has been input by the freeword input screen;
   if a character has been input, determines whether a next character of the input search term is being input by the freeword input screen;
   when the next character is being input, causes the display unit to display an attribute specifying screen superimposed on at least part of the freeword input screen, the attribute specifying screen displaying an attribute corresponding to at least one search term candidate corresponding to the input search term, the attribute specifying screen displaying a character input key at a location corresponding to an input key for the next character that is being input on the freeword input screen, the attribute specifying screen being configured such that an attribute selection key permitting selection of the displayed corresponding attribute is located adjacent to the character input key, without any intervening keys, so that the attribute selection key can be selected at the same time that the next character is input by a user flicking a finger from the character input key towards the attribute selection key.

2. The searching device according to claim 1, wherein the attribute specifying screen further displays the number of the candidates of the input search term, for the displayed corresponding attribute.

3. The searching device according to claim 1, wherein the attribute specifying screen further displays another attribute for which does not correspond to any search term candidate, the other attribute being displayed in a manner indicating that it cannot be selected.

4. A searching method comprising:
   accessing a data storage unit that stores a plurality of pieces of data, each of which prescribes search terms respectively corresponding to a plurality of attributes of the piece of data;

causing a display unit to display a freeword input screen that is configured to receive input specifying characters that constitute an input search term one by one;

determining, with a control unit, whether a character of the input search term has been input by the freeword input screen;

if a character has been input, determining, with the control unit, whether a next character of the input search term is being input by the freeword input screen; and when the next character in the input search term is being input, causing the display unit to display an attribute specifying screen superimposed on at least part of the freeword input screen, the attribute specifying screen displaying an attribute corresponding to at least one search term candidate corresponding to the input search term the attribute specifying screen displaying a character input key at a location corresponding to a input key for the next character that is being input on the freeword input screen, the attribute specifying screen being configured such that an attribute selection key permitting selection of the displayed corresponding attribute is located adjacent to the character input key, without any intervening keys, so that the attribute selection key can be selected at the same time that the next character is input by a user flicking a finger from the character input key towards the attribute selection key.

5. A non-transitory computer-readable storage medium storing a computer-executable program for performing a search, the program comprising:

instructions for accessing a data storage unit that stores a plurality of pieces of data, each of which prescribes search terms respectively corresponding to a plurality of attributes of the piece of data;

instructions for causing a display unit to display a freeword input screen that is configured to receive input specifying characters that constitute an input search term one by one;

instructions for determining whether a character of the input search term has been input by the freeword input screen;

instructions for, if a character has been input, determining whether a next character of the input search term is being input by the freeword input screen; and instructions for, when the next character in the input search term is being input, causing the display unit to display an attribute specifying screen superimposed on at least part of the freeword input screen, the attribute specifying screen displaying an attribute corresponding to at least one search term candidate corresponding to the input search term the attribute specifying screen displaying a character input key at a location corresponding to a input key for the next character that is being input on the freeword input screen, the attribute specifying screen being configured such that an attribute selection key permitting selection of the displayed corresponding attribute is located adjacent to the character input key, without any intervening keys, so that the attribute selection key can be selected at the same time that the next character is input by a user flicking a finger from the character input key towards the attribute selection key.

* * * * *